(12) United States Patent
Hess

(10) Patent No.: US 6,301,969 B1
(45) Date of Patent: Oct. 16, 2001

(54) PRESSURE TRANSDUCER ASSEMBLY ON A PROCESS CIRCUIT OF A PROCESS PLANT

(76) Inventor: Martin Hess, Kiliansplatz 2, D-80339 München (DE)

( * ) Notice: Subject to any disclaimer, the term of this patent is extended or adjusted under 35 U.S.C. 154(b) by 0 days.

(21) Appl. No.: 09/564,182

(22) Filed: May 4, 2000

(30) Foreign Application Priority Data

May 7, 1999 (DE) .............................................. 199 21 172

(51) Int. Cl.[7] ...................................................... G01L 7/00
(52) U.S. Cl. .............................................................. 73/756
(58) Field of Search .............................. 73/706, 714, 756, 73/861.66, 861.42; 137/112, 340, 356, 385, 594, 595, 597; 29/157 R, 469, 200, 282

(56) References Cited

U.S. PATENT DOCUMENTS 4,672,728 * 6/1987 Nimberger ......................... 29/157 R
5,920,016 * 7/1999 Broden .................................. 73/756

* cited by examiner

Primary Examiner—William Oen
(74) Attorney, Agent, or Firm—Flint & Kim, P.A.

(57) ABSTRACT

The invention relates to a pressure transducer assembly (1; 24) connected to a process circuit of a process plant by at least one fluid line (5; 26, 27; 61). There is a flange connection (7; 33) between connections on the process circuit and the fluid line and a flange connection (9; 35) between a connection block (3; 32) and the fluid line (5; 26, 27; 61). Each flange connection has a flange (8, 11; 34, 37; 53; 62) on the fluid line. According to the invention, at least one of the flanges (8, 11; 34, 37; 53; 62) on the fluid line is made in two parts and consists of a flange connection piece (14; 46, 50; 54) screwed to an end of the fluid line. The flange connection piece provided with an axial passage bore (18; 47; 55) and of a flange element (15; 48, 51; 56, 58; 64) having a sealing face (19). A slipped-over separate flange (22; 49, 52; 57) affixed to a contact surface (10; 36; 59) which reaches over the flange element (15; 48, 51; 56, 58; 64) and connects it to the contact surface (10; 36; 59) so as to press with a sealing face (19) of the flange element against the contact surface (10; 36; 59). A great flexibility is provided by a choice among different flange forms, and at the same time no tolerance problems occur. In particular problems in the alignment of hole patterns are minimized, while great mechanical strength is ensured. All this is achieved by connecting the pressure transducer assembly through flange and threaded connections according to the invention, rather than welding the pieces of the assembly together.

22 Claims, 5 Drawing Sheets

PRESSURE TRANSDUCER ASSEMBLY ON A PROCESS CIRCUIT OF A PROCESS PLANT

BACKGROUND OF THE INVENTION

The present invention relates to a pressure transducer assembly for a process circuit used in a process plant.

In process plants, such as chemical and refining plants, pressure transducers installed on the site are used as field instruments to measure fluid pressure. Pressure transducers are used for example to measure the fluid pressure and to detect the extent that the process circuit is full of fluid. Measuring diaphragms with differential pressure transducers are frequently used to ascertain the fluid flow in the circuit.

A known pressure transducer assembly of this type (WO 97/22855) includes a fluid line between the process circuit and the pressure transducer. The fluid line is connected at both ends via flange connections to connections on the process circuit and on the pressure transducer.

In practice, the pressure transducer assembly is designed in this case as a differential pressure transducer assembly with two parallel fluid lines. The transducer and circuit connections to the process line consist of welded flange connection pieces. Similarly, flange connection pieces are welded on both fluid line ends and are then screwed to the flange connections on the process circuit and on the pressure transducer.

In a generally known pressure transducer assembly, the pressure transducer is located relatively far from the process circuit and is connected with long flexible fluid lines. Such a pressure transducer assembly is expensive, since the pressure transducer and the valve beneath it must be independently supported at a suitable location. The valve and the pressure transducer are then attached to each other. After the laborious installation of the valve and the pressure transducer, the very long fluid lines can be connected to the assembly. The long fluid lines are used in the prior art to prevent the overheating of the pressure transducer when hot fluids are to be carried. While the long fluid lines may reduce the overheating problem, they often produce inaccurate results, thereby defeating the purpose of the transducer assembly altogether.

In a pressure transducer assembly of this type (WO 97/22855) the assembly is constructed and held directly on the fluid line in order to reduce the installation costs, so that the fluid lines which are short and stable in this case may take over a support function for both the valve and the pressure transducer. When the fluid lines are used as a means of support in addition to both measuring and transporting fluids, the welds connecting the fluid lines to the arrangement are put under great stress. The strength of the entire assembly is thereby determined by the quality of these welded connections. This often works to the detriment of the assembly and the weld connections must be made precisely and expensively or else the entire arrangement will be rendered weak.

In addition, when short fluid lines are used in an effort to gain stability and accuracy while at the same time cutting costs, the flexibility and ability to rotate that the traditionally long fluid lines offered is lost. This means that the pattern of holes used in the flange connections must line up and fit exactly at both fluid line ends after the flanges have been welded on. If these hole patterns are off and twisted even minimally, a connection may no longer be possible because the tolerances cannot be compensated for.

Many types of flanges, including the oval and double-oval flanges or the circular disk flanges with varied hole patterns are used depending on where and for what applications they are to be used. Once the flange connection pieces have been welded to the ends of the fluid lines, the flange configuration becomes fixed and the possibility of interchanging the separate flange designs for increased flexibility is no longer a possibility.

A flange connection consisting of two parts with a separate flange that connects a manometer to a measuring bore is also known (German patent 939 292). The manometer is used to measure the differences in two fluid pressures. The changing temperatures of such an assembly, often causes radial movements of the manometer between the separate screwed on flange and the flange connection piece. In anticipation of this movement the separate flange is screwed on only tight enough to hold the manometer on. The resulting gaps allow the assembly to compensate for the expected operational radial shifts.

The above German patent also incorporates a flange pipe with a sliding guide which is placed over the flange connection pieces in an axial direction. The flange pipe then allows for compensation for the axial temperature influenced movements of the assembly as well. Because of a connection which allows for both radial and axial sliding, this design is not suitable to also serve a support function for an attached pressure transducer and valve.

Accordingly, an object of the invention is to develop a pressure transducer assembly that can be held together with a selection of interchangeable flange forms to achieve flexibility and the possibility of adaptation of the assembly to different demands.

It is also an object of the invention to eliminate the frequently experienced pressure transducer assembly problems with tolerances with respect to the alignment of the connection hold patterns.

The present invention maintains great mechanical strength of the assembly without relying on welding. By eliminating the permanent fixation which welding brings, the present invention allows for a flexibility previously unknown in an assembly which must be strong enough to serve a support function.

SUMMARY OF THE INVENTION

The above objectives are accomplished according to the present invention by providing at least one of the flanges on the side of the fluid line that is made in two parts and consists of a flange connection piece and a loose flange. The flange connection piece is securely screwed into the corresponding fluid line end. The flange connection piece has an axial passage bore on one end and a flange element with a sealing surface on the other. The separate flange is placed over the flange connection piece and reaches over the flange element, pressing it via a sealing surface against the contact surface, whereby the separate flange is screwed either to the respective contact surface on the process circuit connection or to the contact surface on the pressure transducer connection.

In this manner great flexibility becomes advantageously possible through the selection and possibility of choosing and substituting different flanges to hold the assembly together. Separate flanges with an array of different shapes are to be provided which can then be combined during the assembly with the flange connection piece being affixed through the selected loose flange to the fluid line end. The flange connection pieces are interchangeable and can be used in numerous combinations with the differing separate flange forms.

Because of the screw connections between the fluid line ends and the appertaining flange connection pieces, no welded connections are necessary. By replacing the welded connections with screwed ones, the flexible arrangement is capable of great mechanical strength, even when assuming a supporting function for the pressure transducer. If necessary, simple sealing welds can be made (preferably after assembly) but these are not required for mechanical strength.

The separate flange that is placed over the flange element of the flange connection piece makes it possible to obtain a simple alignment of the hole patterns by simply rotating the separate flange into position. No tolerance problems arise during assembly. For this reason, and in combination with the screw connections, installing this pressure transducer assembly is considerably simpler than for other arrangements of this type, in particular because no welded connections (at most sealing welds) are necessary at the fluid line ends.

Advantageously, the flange connection piece that is provided with an outer thread is screwed into a corresponding inner thread on the fluid line end. Depending on the conditions, the flange connection pieces can also be secured to a contact surface on the fluid line end, in particular when a fluid line is made in the form of a stable fluid line block.

For required locking, a stop valve may be installed in a known manner in the fluid line block and/or that a valve be installed as a connection block before the pressure transducer.

To ensure good centering between the separate flange and the flange element of the flange connection piece, the contact surface may be conical.

To ensure a tight fit, an annular groove containing an 0 ring on the sealing surface of the flange element may be utilized, and in particular in case of low pressure, a flat seal can also be used.

The flange design may be provided in two ways. A flange connection piece with a second flange element can be used at one fluid line end. At the opposite end of the fluid line however, a flange in one part is installed and screwed into the fluid line end. In this manner the mechanical connection is obtained at both ends through a stable screw connection, but different flange designs can be used as needed. The tolerance compensation can be obtained here at one fluid line end through the rotatable separate flange on the other side.

Separate flanges of different configurations, such as oval flanges, double oval flanges or circular-disk flanges can be provided for assemblies, without having to provide pre-assembled, welded units with predetermined flange configurations.

The pressure transducer assembly can be used for simple pressure measurement with only one fluid line, as well as for differential pressure measurements, by using two parallel fluid lines.

Different designs of the flange connections according to the invention is in principle also advantageously possible with a conventional pressure transducer assembly with long, flexible fluid lines. The totality of the mentioned advantages, however, is best achieved with the direct, free-bearing attachment of the pressure transducer to the process circuit when the fluid line assumes a supporting function.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF THE PREFERRED EMBODIMENT

Figure 1:
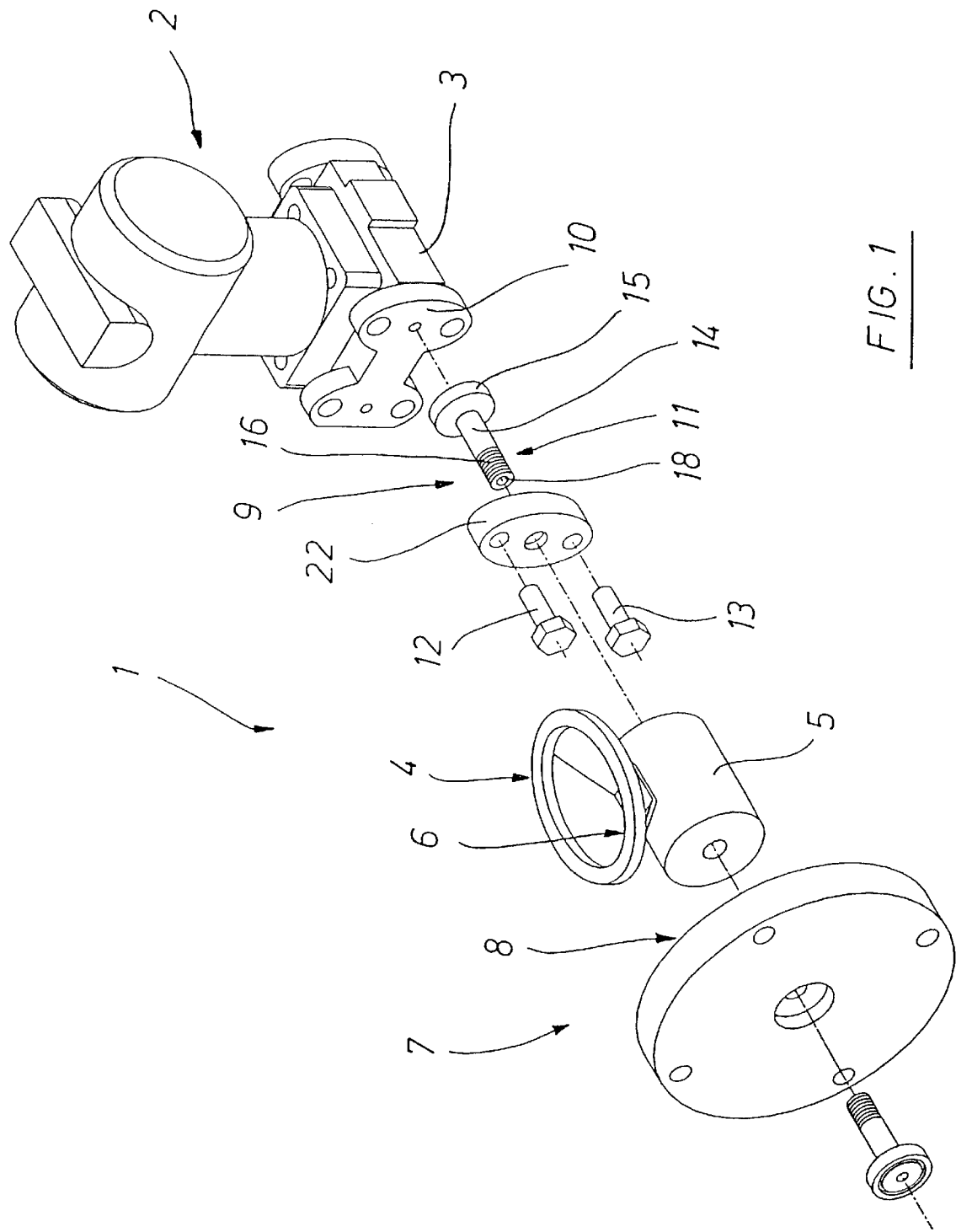
FIG. 1 shows a schematic and exploded view of a pressure transducer assembly with a fluid line in perspective.

Referring now to the drawings, the invention will now be described in more detail.

In FIG. 1 a pressure transducer assembly 1 is shown in an exploded view, in perspective. Pressure transducer assembly 1 comprises a pressure transducer 2 with a connection block 3 made in the form of a valve. A fluid line 5 is disposed between a process circuit (not shown) and valve 3. A stop valve 6 is furthermore installed on the fluid line 5.

A first flange connection 7 is provided between the connections on the process circuit and fluid line 5. Flange connection 7 has a corresponding first flange 8 which can be connected to a contact surface on the process circuit side (not shown) by means of screw connections. In addition, a second flange connection 9 is provided between valve block 3 of pressure transducer 2 and fluid line 5. Flange connection 9 consists of a contact surface 10 on the side of the valve block and a corresponding second flange 11 on the side of the fluid line. Second flange 11 on the side of the fluid line can be connected to contact surface 10 on the side of valve block 3 by means of screw connections 12, 13.

Figure 2:
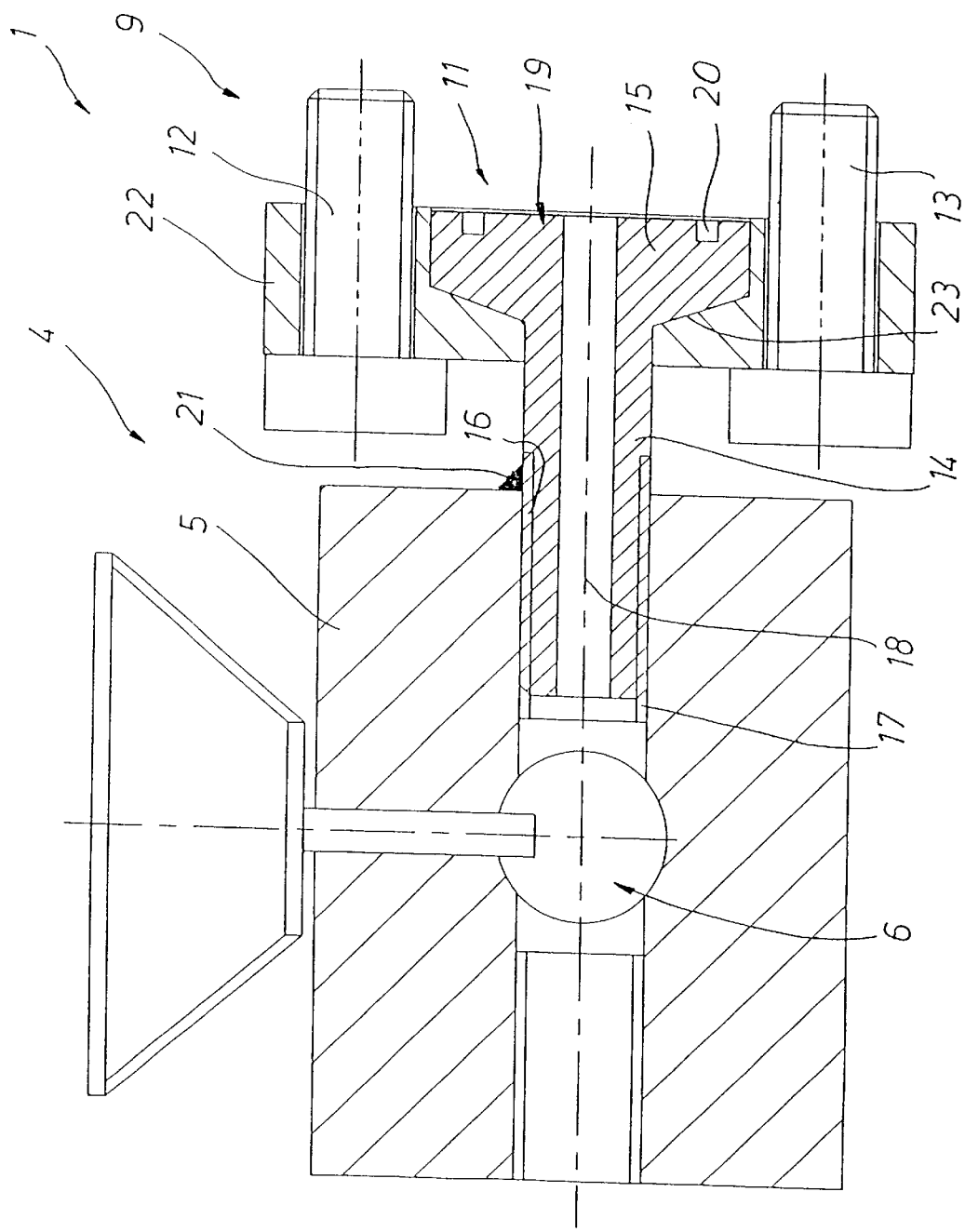
FIG. 2 shows a schematic sectional view of a flange connection between a pressure transducer and a fluid line.

In FIG. 2, second flange connection 9 between valve block 3 of pressure transducer 2 and fluid line 5 is shown enlarged in cross-section. As can be seen from this drawing, second flange 11 on the side of the fluid line is made in two parts and consists of a flange connection piece 14 with a flange element 15 as well as of a separate flange 22 shown here in form of an oval flange, as an example.

Flange connection piece 14 is provided with outer threads 16 by means of which it can be screwed in firmly into inner threads 17 on the fluid line end. Furthermore flange connection piece 14 has an axial passage bore 18. In addition, flange element 15 is provided with an annular groove 20 on a front sealing surface 19 into which an 0-ring can be inserted as a sealing ring. When flange connection piece 14 is screwed in, it can likewise be provided with a sealing welding seam 21 on the side of the fluid line.

As can furthermore be seen in FIG. 2, separate flange 22 is slipped over the flange element 15, whereby a conical contact surface 23 is formed between separate flange 22 and flange element 15. Flange 22 reaches over flange element 15 in such manner that flange element 15 is pressed with forward sealing surface 19 against contact surface 10 of the valve block when screw connections 12,13 are tightened.

First flange 8 on the fluid line is constructed in a similar manner as second flange 9 on the fluid line, as can be seen in FIG. 1. A flange connection piece 8a which can be screwed into the opposite fluid line end is provided together with a flange element and a separate flange in the form of a ring-shaped flange which reaches over the flange element.

Figure 3:
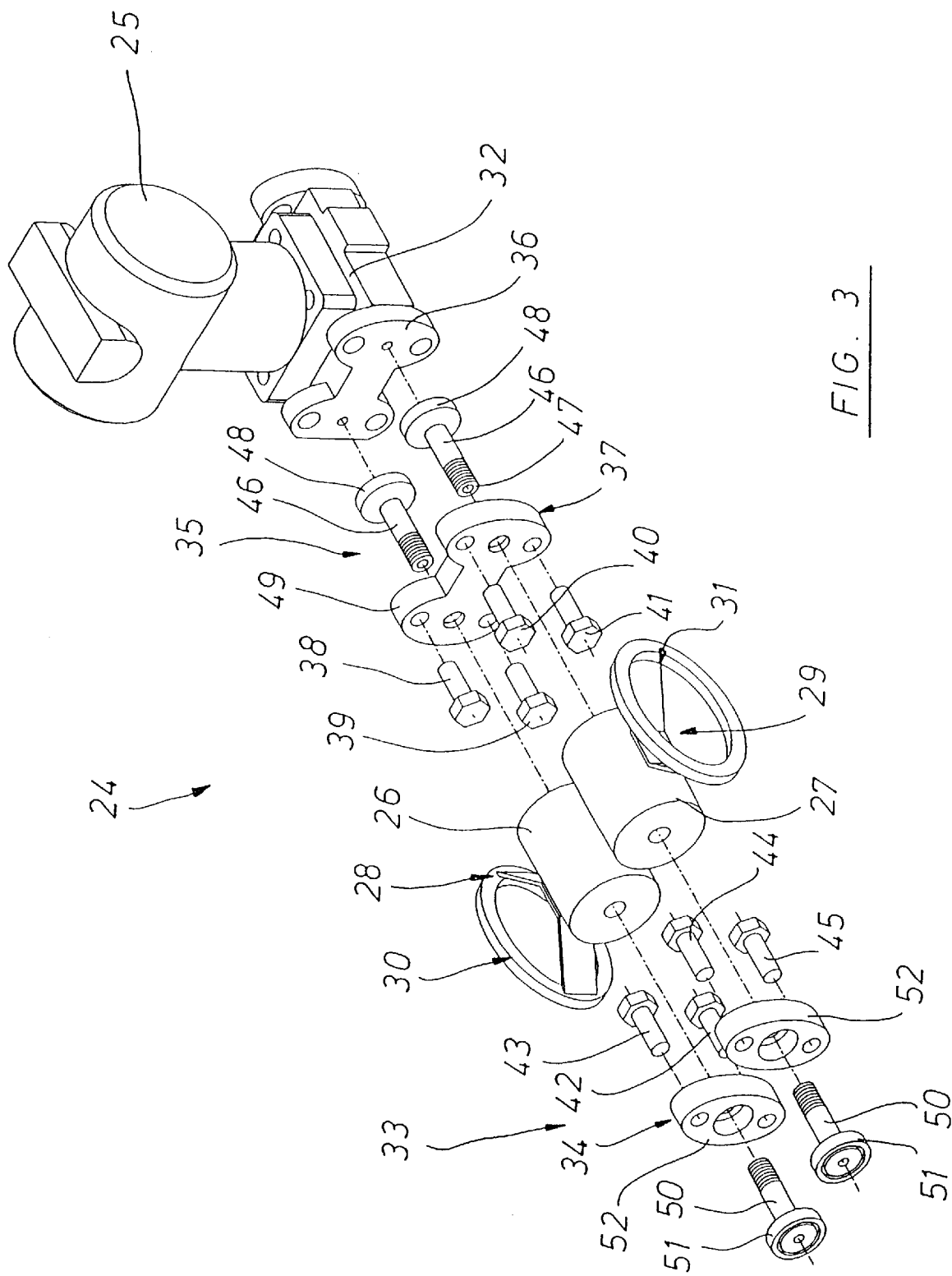
FIG. 3 shows a schematic exploded view of a pressure transducer assembly with two fluid lines to measure differential pressures.

FIG. 3 shows another embodiment of a pressure transducer assembly 24 in a perspective and exploded view, in which pressure transducer 25 is a differential pressure transducer with two parallel fluid lines 26, 27 and connected to a metering orifice arrangement (not shown) of a process circuit. Fluid lines 26, 27 are here again part of a fluid line block 28, 29 and each of the lines includes a stop valve 30, 31. Between the connections of the process circuit (not shown) and fluid lines 26, 27, a first flange connection 33 is provided which consists of a contact surface (not shown) on the process circuit, as well as associated first flange 34 on the fluid line. The first flanges 34 on the side of the fluid lines can be connected via screw connections 42, 43, 44, 45 to the contact surface on the process circuit.

Between the valve block 32 of the differential pressure transducer and fluid lines 26, 27, a second flange connection 35 is provided and consists of a contact surface 36 on the valve block and a corresponding associated second flange 37 on the fluid line. Second flange 37 can be connected via screw connections 38, 39, 40, 41 to contact surface 36 on the valve block.

In the embodiments according to FIGS. 1 and 3, second flange 37 on the fluid line is made in two parts and consists of a flange connection piece 46 screwed into the corresponding fluid line end having an axial passage bore 47, a flange element 48, and a double-oval flange in the form of a separate flange 49. Separate flange 49 is slipped over flange elements 48 in such manner that screw connections 38, 39, 40, 41 tighten flange element 48 to connect firmly to the surface of the valve block, and its sealing surface is pressed against contact surface 36.

In a similar manner first flange 34 on the side of the fluid line is made in two parts, consisting of flange connection piece 50 with a flange element 51, and an oval flange in form of a separate flange 52. Flange connection piece 50 is screwed into a fluid line end and separate flange 52 is slipped over flange element 51. As a result, separate flange 52 reaches over flange elements 51 in such manner that flange elements 51 are firmly connected to the contact surface of the process circuit when screw connections 42, 43, 44, 45 are tightened. Flange elements 51 are pressed by their sealing surface against the contact surface of the process circuit.

Figure 4:
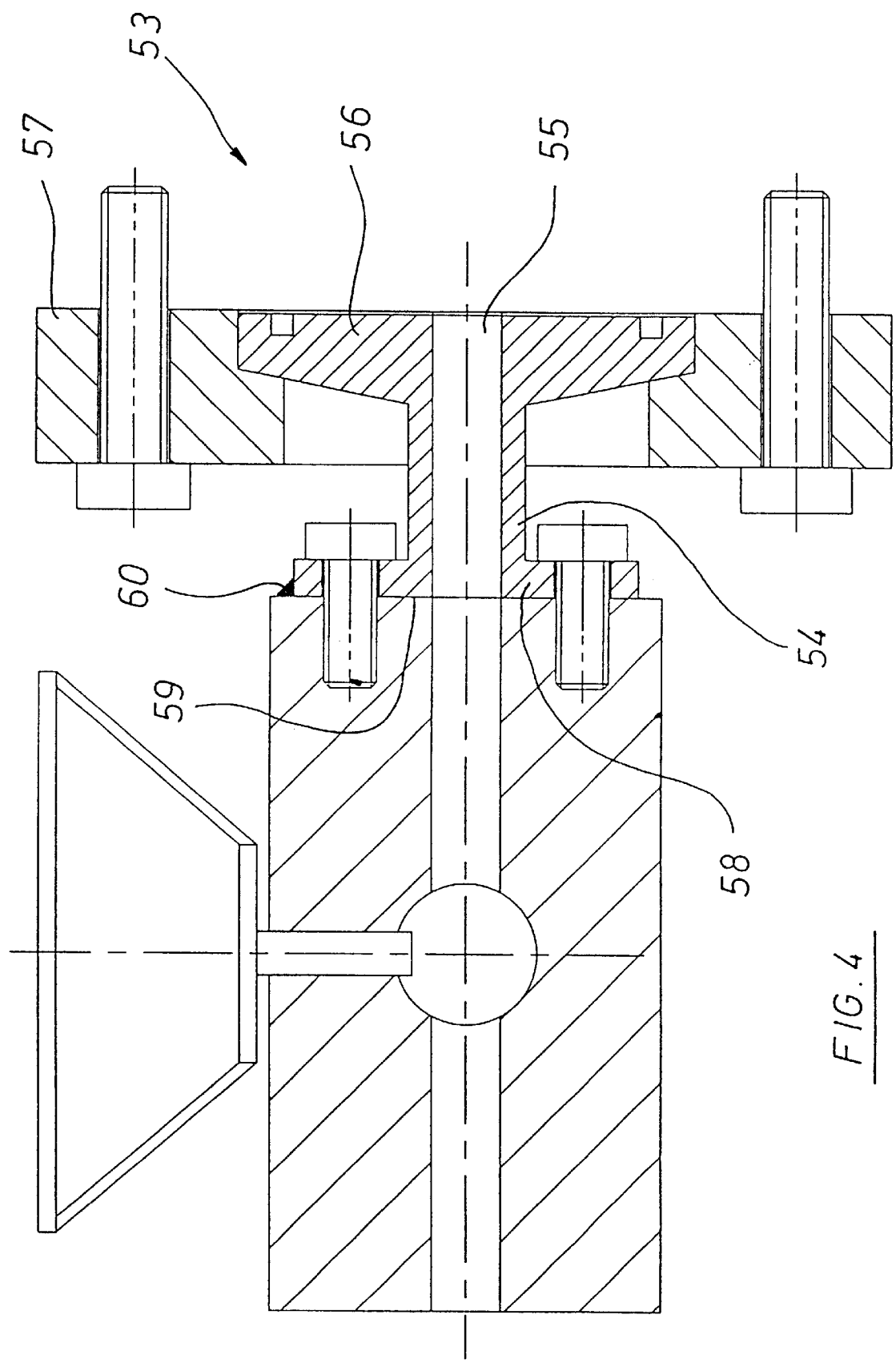
FIG. 4 shows a schematic sectional view of another embodiment of a flange connection between a pressure transducer and a fluid line.

In FIG. 4, flange connection piece 54 is screwed firmly against a surface 59 by means of a second flange element 58. In order to make it possible to assemble flanges 53 on the fluid line, a recess in loose flange 57 is sized so that it can be slipped over second flange element 58. If necessary, a sealing weld 60 can be provided between second flange 58 and the measuring line end.

Figure 5:
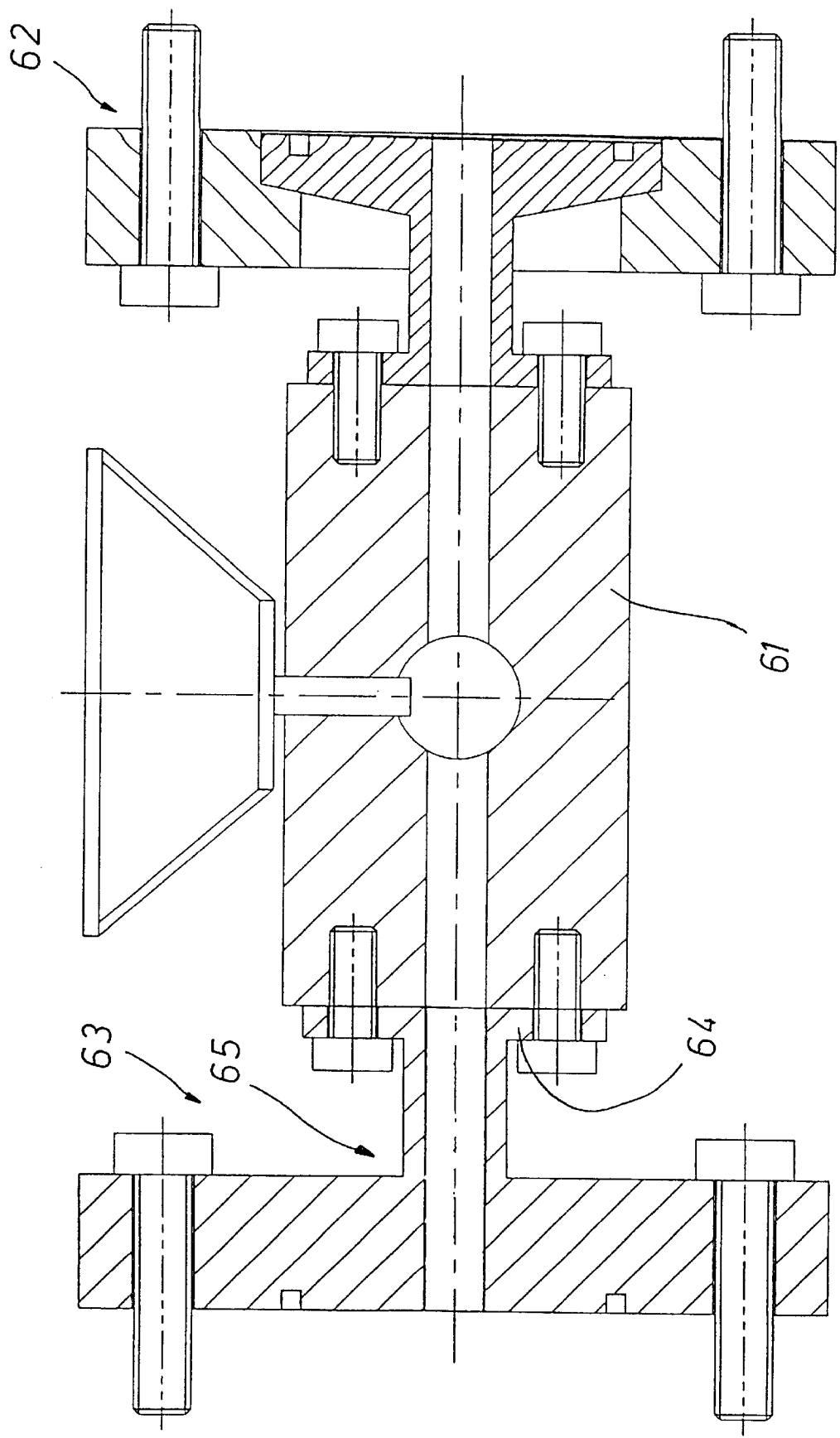
FIG. 5 shows a schematic sectional view with a flange connection between the process circuit and the fluid line as well as a flange connection between the pressure transducer and the fluid line.

FIG. 5 shows the example of a fluid line 61 with a flange 62 on the fluid line corresponding to the two-part flange connection of FIG. 4 is provided on the right-end of the fluid line. A flange 64 on the fluid line corresponding to the one-part flange connection of FIG. 3, is provided on the left end of the fluid line.

While a preferred embodiment of the invention has been described using specific terms, such description is for illustrative purposes only, and it is to be understood that changes and variations may be made without departing from the spirit or scope of the following claims.

What is claimed is:

1. A pressure transducer assembly for connection to a process circuit in a process plant wherein at least one fluid line is disposed between the process circuit and a connection block of the pressure transducer assembly, a first flange connection disposed between the process circuit and the fluid line which includes a process circuit contact surface which mates with a first flange on the fluid line, connection means for connecting said contact surface and first flange together; a second flange connection disposed between the connection block of the pressure transducer and the fluid line which includes a connection block contact surface on the connection block mating with a second flange on the fluid line; and connection means for connecting the contact surface and second flange together; wherein the improvement comprises:

at least said second flange including a flange connection piece having an axial passage bore;

said flange connection piece adapted for connection to the connection block contact surface of the fluid line and having a flange element with a sealing face for connection to the contact surface;

a separate flange received over said flange connection piece wherein said separate flange may be secured to the contact surface; and said separate flange fitting over said flange element of said flange connection piece to connect the flange element firmly against the contact surface with said sealing face pressed against said contact surface.

2. The assembly of claim 1 wherein said first flange connection piece includes a threaded end, and said fluid line includes inner threads to accept the threaded end of said flange connection piece.

3. The assembly of claim 1 including a fluid line contact surface and wherein said flange connection piece includes a second flange element affixed to the contact surface of the fluid line.

4. The assembly of claim 1 wherein said fluid line includes a fluid line block having one of a screw-in bore and contact surface on opposing ends.

5. The assembly of claim 4 wherein the fluid line block contains a stop valve.

6. The assembly of claim 1 wherein a valve block is installed before the pressure transducer as a connection block.

7. The assembly of claim 1 including a conical contact surface formed between said separate flange and said flange element having a conical shape.

8. The assembly of claim 1 wherein said sealing face includes a seal for sealing off said fluid passage.

9. The assembly of claim 1 wherein said second flange connection includes a second flange element and said first flange element on opposing sides of the fluid line.

10. The assembly of claim 1 wherein separate flanges have one of an oval, double oval, and circular shape.

11. The assembly of claim 1 wherein the pressure transducer is a differential pressure transducer connected to the fluid lines and a measuring diaphragm arrangement of said process circuit.

12. The assembly of claim 1 wherein at least one fluid line is short and generally rigid to serve as a support for the pressure transducer and said connection block.

13. A pressure transducer assembly for connection to a process circuit in a process plant wherein at least one fluid line is disposed between the process circuit and a connection block of the pressure transducer assembly, a first flange connection disposed between the process circuit and the fluid line which includes a process circuit contact surface which mates with a first flange on the fluid line, connection means for connecting said contact surface and first flange together; a second flange connection disposed between the connection block of the pressure transducer and the fluid line which includes a connection block contact surface on the connection block mating with a second flange on the fluid line; and connection means for connecting the contact surface and second flange together; wherein the improvement comprises:

said first and second flanges including a flange connection piece having an axial passage bore;

said flange connection piece adapted for connection to a respective contact surface of said process circuit and connection block, and said flange connection piece having a flange element with a sealing face for bearing against the contact surface;

separate flanges received over said flange connection pieces wherein said separate flanges may be secured to the respective contact surfaces; and said separate flanges fitting over said flange elements of said flange connection pieces to connect said elements firmly against the contact surface with said sealing face pressed against said contact surface.

14. The assembly of claim 13 wherein said first flange connection piece includes a threaded end, and said fluid line includes inner threads to accept the threaded end of said flange connection piece.

15. The assembly of claim 13 wherein each said flange connection piece includes a second flange element affixed to the contact surface of the fluid line.

16. The assembly of claim 13 wherein a valve block is installed before the pressure transducer as the connection block.

17. The assembly of claim 13 including a conical contact surface formed between each said separate flange and said flange element having a conical shape.

18. The assembly of claim 13 wherein said sealing face includes a seal for sealing off said fluid passage.

19. The assembly of claim 13 wherein said second flange connection includes a second flange element and said first flange element on opposing sides of the fluid line.

20. A pressure transducer assembly for connection to a process circuit in a process plant wherein at least one fluid line is disposed between the process circuit and a connection block of the pressure transducer assembly, a first flange connection disposed between the process circuit and the fluid line which includes a process circuit contact surface which mates with a first flange on the fluid line, connection means for connecting said contact surface and first flange together; a second flange connection disposed between the connection block of the pressure transducer and the fluid line which includes a connection block contact surface on the connection block mating with a second flange on the fluid line; and connection means for connecting the contact surface and second flange together; wherein the improvement comprises:

a flange connection including a flange connection piece having an axial passage bore;

said flange connection piece adapted for connection to one of the connection block contact surface and the process circuit contact surface, and said flange connecting piece having a flange element with a sealing face for bearing against the contact surface;

a separate flange received over said flange connection piece wherein said separate flange may be secured to the contact surface; and said separate flange fitting over said flange element of said flange connection piece to connect the flange element firmly against the contact surface with said sealing face pressed against said contact surface.

21. The assembly of claim 20 wherein said first flange connection piece includes a threaded end, and said fluid line includes inner threads to accept the threaded end of said flange connection piece.

22. The assembly of claim 20 wherein said flange connection piece includes a second flange element affixed to the contact surface of the fluid line.

\* \* \* \* \*